(No Model.)

3 Sheets—Sheet 1.

M. BURKE.
CORN PLANTER.

No. 442,350.  Patented Dec. 9, 1890.

Witnesses:
A. W. Davenport
S. B. Dover.

Inventor:
M. Burke
By A. M. Stout atty (No Model.) 3 Sheets—Sheet 2.

M. BURKE.
CORN PLANTER.

No. 442,350. Patented Dec. 9, 1890.

Witnesses:
C. W. Davenport
S. B. Dover.

Inventor:
M. Burke
By W. M. Stout
atty (No Model.) 3 Sheets—Sheet 3.

M. BURKE.
CORN PLANTER.

No. 442,350. Patented Dec. 9, 1890.

Witnesses:
C. W. Davenport
S. B. Dover.

Inventor:
M. Burke
By A. M. Stout atty

UNITED STATES PATENT OFFICE.

MATTHEW BURKE, OF BISMARCK, NEBRASKA.

CORN-PLANTER.

SPECIFICATION forming part of Letters Patent No. 442,350, dated December 9, 1890.

Application filed March 21, 1888. Serial No. 268,018. (No model.)

*To all whom it may concern:*

Be it known that I, MATTHEW BURKE, of Bismarck, county of Platte, and State of Nebraska, have invented certain Improvements in Corn-Planters, of which the following is a specification.

Figure 1:
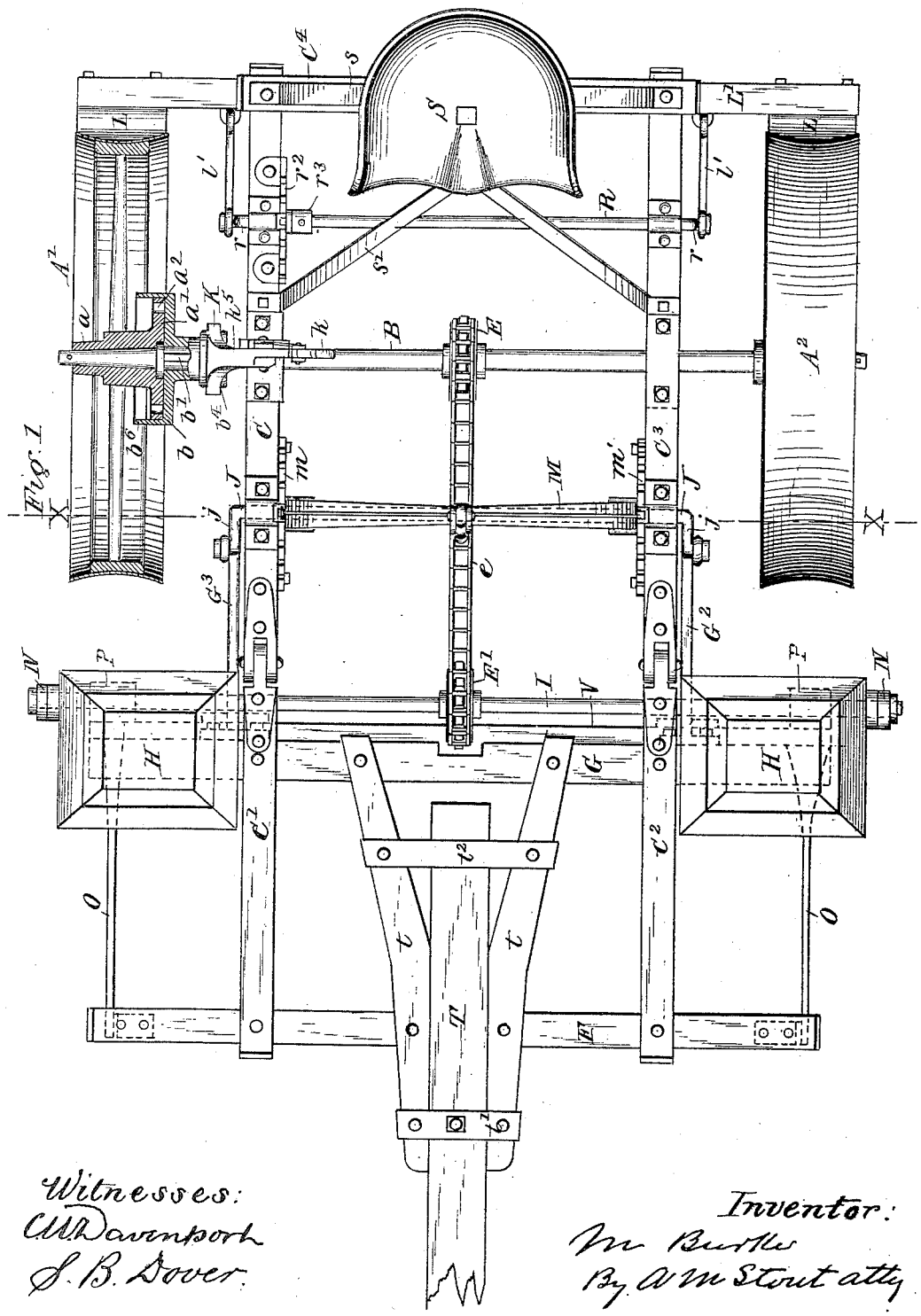
Figure 2:
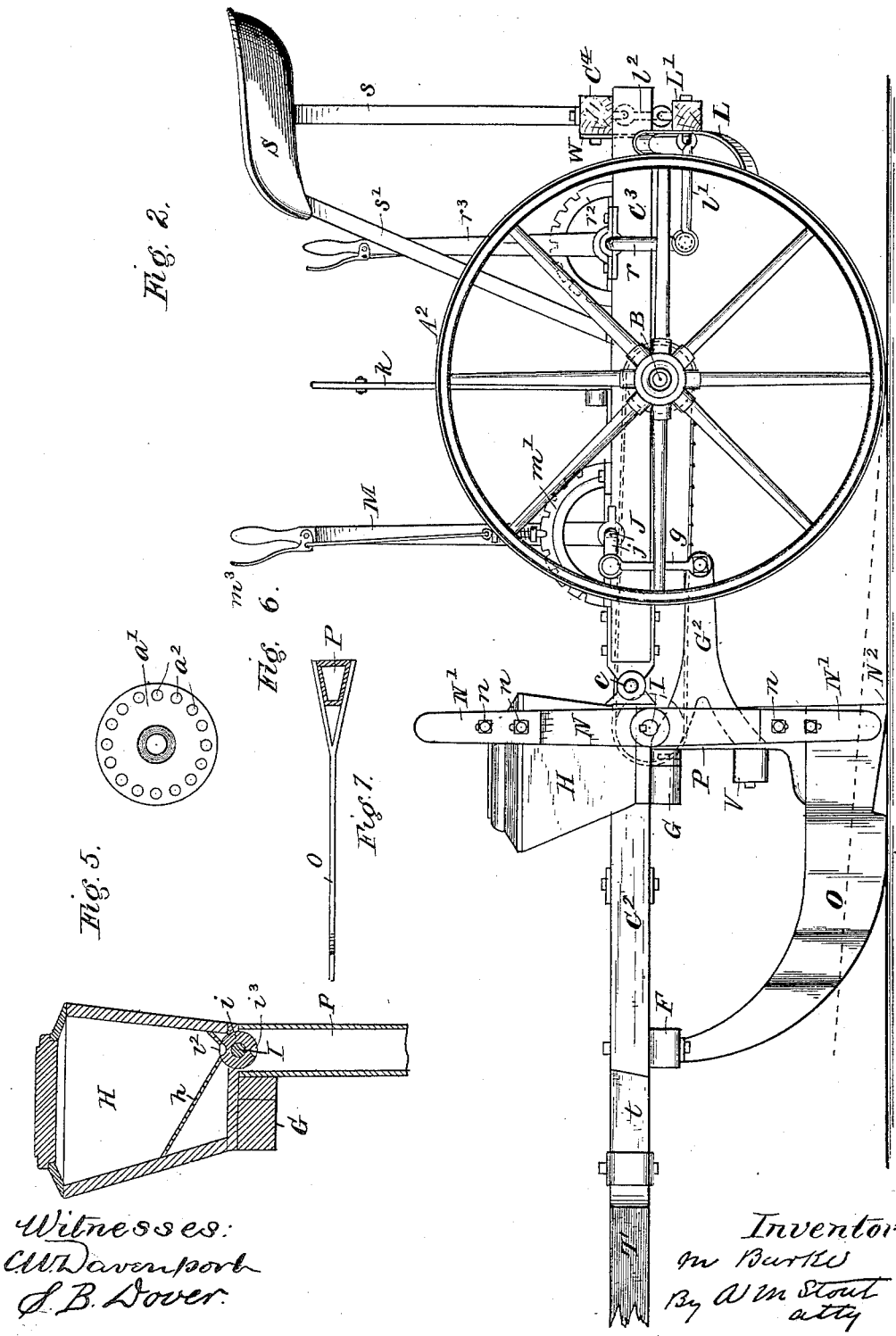
Figure 3:
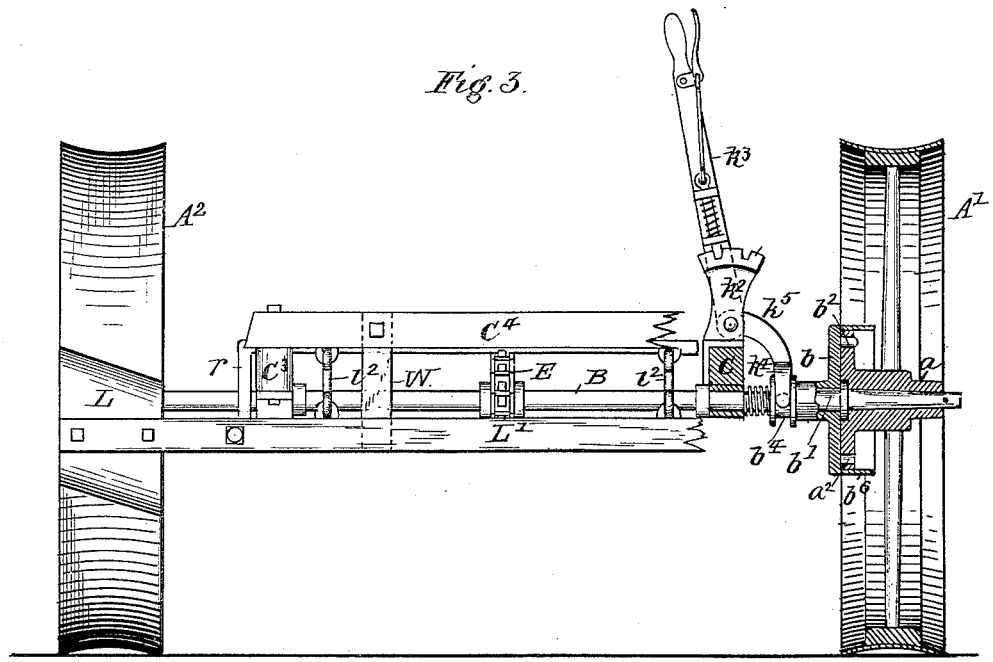
Figure 4:
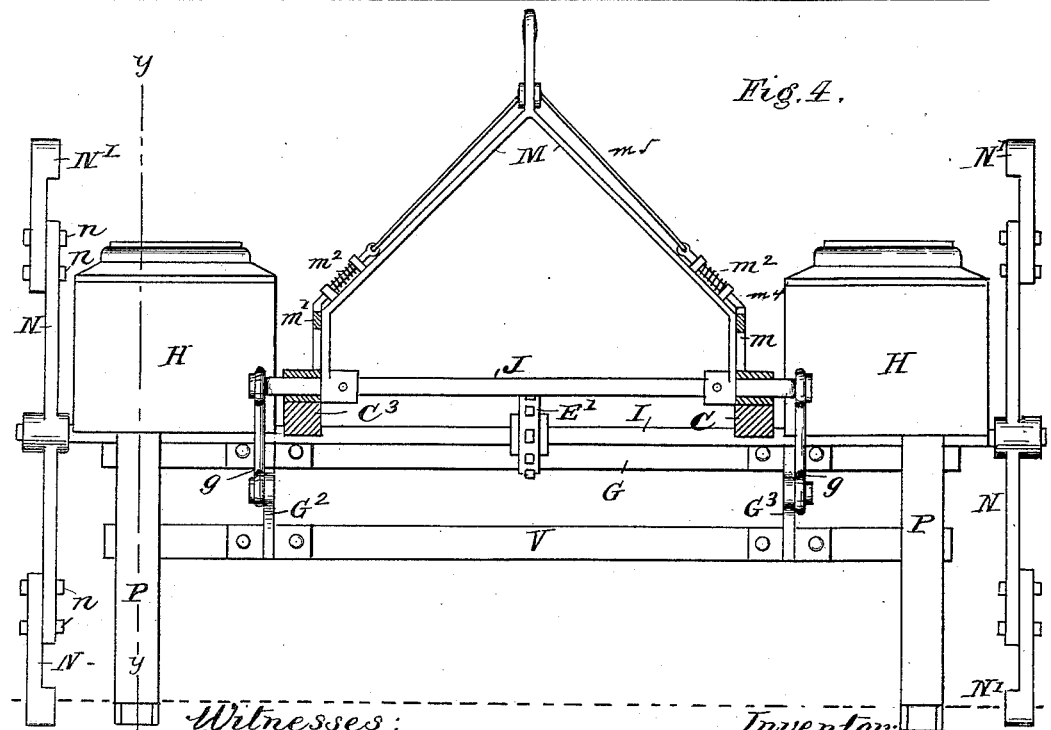

My said invention will be fully described hereinafter with reference to the accompanying drawings, in which—
Figure 1 represents a plan of a corn-planting machine embracing my improvement, except that the wheel A' and a portion of the hub $a$ are shown in horizontal section; Fig. 2, a side elevation of the machine; Fig. 3, an elevation of the rear parts of the same, with a vertical central section of the wheel A', of the hub $a$, and some some other parts; Fig. 4, a transverse vertical section of the machine as indicated by the broken line $x$ $x$ in Fig. 1; Fig. 5, a transverse vertical section of the hopper H on line $y$ $y$ in Fig. 4; Fig. 6, a detail view of the disk of hub of wheel A'; Fig. 7, a detail view of one of the shoes $o$.

The carriage and the manner in which the several parts thereof are connected together and their relative position controlled involves the principal part of my invention. The carriage consists of two frames—the wheel-frame and the runner-frame. Each frame consists of side-bars, one upon each side, rigidly secured to the one upon the other side of the frame, and these side bars upon one frame are pivoted to the side bars of the other frame, the movement of the frames upon the connecting-pivot being controlled by a lever rigidly secured to a crank-shaft rotating in journals on the side bars of the wheel-frame, cranks at each end of the crank-shaft, and connecting-links extending therefrom to arms rigidly secured to the runner-frame.

A' and A² are wheels mounted upon the axle B, upon which are, near the wheels, the long bars C and C³, to which are hinged the bars C' and C² of the runner-frame, upon which are bolted, as shown, the cross-bars F and G, and upon them are bolted the tongue-hounds $t$ $t$, which are braced together by cross-bars $t'$ and $t^2$, which are bolted to the hounds, and between the tie-hounds is fastened the tongue T. Across the two long bars C' and C² is the revolving dropper-shaft I, which is furnished with bearings on the bars in which it is confined, and it turns with the seed-cylinders $i$ $i$ in the lower ends of the corn-hoppers H, and the seed-cylinders are provided with recesses $i^2$ and $i^3$, exactly opposite to each other, for the grain to fall into from the hopper and be dropped upon the ground through the spouts P as the shaft I and its seed-cylinders revolve. The hoppers on their insides are provided with the inclined planes $h$ to lead the grains of corn directly into recesses $i^2$ and $i^3$. The hoppers are seated and fastened upon the cross-bar G. Each end of the revolving shaft I has keyed upon it, as shown, a marker N, which is revolved by the shaft, and which will make marks at regular intervals on the ground as the machine moves forward, by which the driver will be guided in starting to drop another row after the first has been dropped. The markers have joints in each of their arms, as shown, by means of which the lengths of the arms may be adjusted as required.

One end of the axle—say the left-hand one, as illustrated in Fig. 3—is provided with a simple journal and its wheel with a like opening, while the other end is provided with a sleeve $b^4$, which is keyed to the axle and a disk $b$ extending out therefrom, and the disk has a flange $b^6$ extending out at a right angle thereto, and the disk has a pin $b^2$ extending outwardly therefrom, adapted to enter the holes $a^2$ in the disk $a'$ on the hub of the wheel A'. The wheel A', on the other hand, is provided with a hub $a$, which has a flange $a'$ thereon corresponding in form to the flange of the sleeve and fitting loosely within the same, and provided with a series of equidistant holes $a^2$ around it near its periphery, corresponding in size and position with the pin $b^2$ and designed to be entered by the pin, and thus a clutch is formed, by means of which when the parts are engaged the wheel and axle will revolve together, but when disengaged the wheel alone will turn upon the journal of the axle. As a device for operating the clutch, I have provided the groove $b^4$ in the sleeve, and within this groove, over the sleeve, fits the forked end of yoke $k^5$, while the other end is pivoted to the foot of lever $k^3$, that is pivoted upon the standard $k^2$, which is firmly attached to long bar C. The standard $k^2$ is provided with a series of notches on its top end, into which a spring-catch attached to the lever enters and holds the lever and clutch to any adjustment required.

Now by means of the sprocket-wheels E and E', of equal size and structure, fastened upon the axle B and the shaft I, respectively, and the endless open-linked chain $e$, traveling over the sprocket-wheels, the motion of the axle is imparted to the shaft, which, as hereinbefore specified, operates the droppers $i$. It will be readily seen, therefore, that at every revolution of the driving-wheels the dropper will drop two hills of corn, and the intervals between the hills will correspond with the peripheries of the wheels. One dropper is on each side of the machine, and the width apart of the rows depends upon the distance between the droppers.

The wheel-frame of the carriage and the runner-frame carrying the hopper, shoes, and spouts are connected together by hinges, as shown, which turn upon the pins $c$. Upon the outer sides of the runner-frame are the shoes $o$, the front ends of which are bolted to the cross-bar F, while their bodies are curved downward until their lower edges are parallel with the surface of the ground, and their back ends are divided vertically, as shown in Fig. 7, and their back edges so cut away as to form square shoulders and to slope downward from the shoulders to their back ends. The shoes are intended to open furrows, into which the corn is dropped directly under the dropper, the spout P extending between the divisions, and their heel-points will pull a portion of the soil over the grains of corn. In order to raise these shoes entirely from the ground when the machine is not in operation, and to adjust them vertically and the depths of furrows made by them when in use, I have devised the following devices, namely: the shoe-shaft J, extending across the carriage-frame, furnished with boxes on the long bars C and $C^3$ and provided with crank-arms $j$ on the outer sides of said bars, which are connected by links $g$ with the rear ends of the arms $G^2$, the arms $G^2$ being rigidly fastened to the bars G and V of the runner-frame. The bar V extends across the frame, and is attached to the spouts P and holds them in true vertical position between the divisions of the shoes. The forked lever M, having its two feet rigidly fastened upon the shoe-shaft J near the side bars C and $C^3$, is used to rock that shaft and adjust the shoes, and in order to hold the lever to any required adjustment the side bars C and $C^3$ are provided with semicircular racks $m$ and $m'$, which are firmly bolted to the bars. To engage with the teeth of these racks, pawls $m^4$, attached to the ends of a rod $m^5$, are suspended by that rod, which itself is passed through the angle of a bell-crank lever, the short end of which is pivoted to the lever M above the fork in it. By operating the bell-crank lever the pawl may be drawn out of any notch, and then the tension of the spring $m^2$ will pull the pawl into any other notch presented to it. When the whole runner-frame with its shoes are forced upward by the use of the devices hereinbefore specified, the pivotal point upon which the wheel-frame turns is the axle B, and the pivotal point about which the runner-frame turns is the outer end of the pole T at the point thereof where it is secured to the neck-yoke of the horses attached to the machine. The pivotal point $c$ of the hinge is raised vertically, and the runner-frame, having the pole T rigidly secured thereto between the hounds $t$, will turn, as described, on the free end of the pole T, and thus the runner-frame is carried upward with the side bars $C'$ and $C^2$ thereof maintained nearly in a horizontal position at all times. The relative position of the wheel-frame and the runner-frame determines the position of the shoes $o$, and by means of the forked lever M, the crank-shaft to which it is secured, and the links connecting such cranks to the arms rigidly secured on the runner-frame these shoes may be raised entirely free from the ground or forced deeply into the ground by a comparatively parallel horizontal position of the side bars of the runner-frame, and when such shoes are forced into the ground the entire weight of the machine and driver will assist in maintaining them in the position desired. The runner-frame being pivoted at each end thereof—that is, bars $C'$ and $C^2$ to the bars C and $C^3$ of the wheel-frame—each of the shoes $o$ will be forced a like distance into the ground without reference to the varying quality or hardness of the ground upon one side or the other of the machine, the depth which the shoes will penetrate into the ground being determined, as stated, by the position of the forked lever M.

In order to keep the carrying and covering wheels free from soil in the form of mud, which would prevent the machine from doing smooth and accurate work, I have devised the scrapers L, which may be made of thin plates of steel and bent into the form shown and have both their ends projecting in a contrary direction to the surface of the wheels when the machine is moving forward, and they are bolted to the brake-bar $L'$, which extends across and in the rear of the machine and is suspended by means of links $l^2$ from the cross-bar $C^4$. Then to regulate the pressure of the brakes I have provided the brake-shaft R, having suitable bearings across the long bars of the carriage, as shown in Fig. 1. Each end of the shaft terminates in a crank $r$, and by means of a link $l'$ is connected with the brake-bar $L'$, and then the lever $r^3$ is rigidly fastened upon the brake-shaft R, and is provided with a spring-pawl operated by a bell-crank lever and spring attachment, as shown in Fig. 2. That spring-pawl engages with the notches in the semicircular rack $r^2$, which is firmly fastened against the side of long bar C, as shown in the same figure. By oscillating the lever the pressure of the scraper is regulated and the spring-pawl holds to any adjustment desired.

It is manifest from the foregoing description that the dropping of corn must necessarily be at equal distances by the automatic action of the parts; that the furrows made by the shoes must be made immediately under the droppers, and that by means of the clutch described the dropping devices can be thrown out of gear by a simple act of the driver and by another equally simple act the whole runner-frame can be raised from the ground, and that if the wheels are kept clean the dropping will be done automatically with absolute accuracy.

What I claim as my invention, and desire to secure by Letters Patent, is—

1. In a corn-planter, a frame consisting of two principal parts, a wheel-frame and a runner-frame, each of the frames composed of a side bar on one side thereof rigidly secured to a side bar on the other side thereof, the frames pivoted together at the ends of the side bars, the wheel-frame pivotally resting on the axle and runners rigidly secured to the runner-frame, a pole rigidly secured at one end between hounds on the runner-frame, arms rigidly secured to the runner-frame, a crank-shaft extending across the wheel-frame and journaled on the side bars thereof, a lever secured to the crank-shaft, and links connecting the crank-arms of the crank-shaft with the arms rigidly secured to the runner-frame, substantially as described.

2. In a corn-planter composed of two principal parts, a wheel-frame and a runner-frame, constructed and hinged together substantially as specified, the combination of the shoe-shaft J, extending across the wheel-frame and having its bearings in bars C and C′ of said frame, and provided with fixed lever M and its ends with crank-arms $j$ and arms $G^2$, the two forks of which are fastened to the runner-frame, the links $g$, connecting the rear ends of the arms with the shoe-shaft, the axle B and the seed-cylinder shaft I, provided, respectively, with the sprocket-wheels E and E′, and the endless chain $e$, the whole adapted to impart motion to the seed-cylinder shaft and at the same time to regulate the depth of the shoes or runners, substantially as described.

3. In a corn-planter, the longitudinal bars C $C^3$, rigidly secured together and pivotally attached at about their center to the axle and flexibly connected at their front end to the side bars of a runner-frame, in combination with runners rigidly secured to the runner-frame, arms rigidly secured to the runner-frame, a crank-shaft journaled in the side bars of the wheel-frame and having crank-arms at each end thereof, links connecting the crank-arms of the crank-shaft with the arms rigidly secured to the runner-frame, and a forked lever rigidly connected to the crank-shaft near each end of said crank-shaft, the forked lever having thereon at each end thereof rack-pawls adapted to be intermeshed with or released from semicircular racks rigidly secured to the wheel-frame by a single bell-crank handle placed above the fork in the lever, substantially as described.

4. In a corn-planter, scrapers formed of thin plates of steel bent into the form shown and secured to a brake-beam having a lever secured thereto by a connecting-link, whereby when the scrapers are forced against the wheels such bent scraper will come in contact with the wheels at the two ends thereof, the lower end of such scraper being nearly in tangential contact with the periphery of the wheel and the upper end of such scraper being nearly in radial contact with the periphery of the wheel, substantially as described.

MATTHEW BURKE.

Witnesses:
W. P. THORNTON,
EDW. J. DAHENS.